(12) United States Patent
Oyasato et al.

(10) Patent No.: US 11,044,371 B2
(45) Date of Patent: Jun. 22, 2021

(54) SERVER APPARATUS, MAINTENANCE MANAGEMENT SYSTEM, AND NON-TRANSITORY COMPUTER READABLE RECORDING MEDIUM THAT RECORDS THE MAINTENANCE MANAGEMENT PROGRAM

(71) Applicant: KYOCERA DOCUMENT SOLUTIONS INC., Osaka (JP)

(72) Inventors: Tomoki Oyasato, Osaka (JP); Tomoyuki Izumi, Osaka (JP); Masaaki Aiba, Osaka (JP); Tetsuyuki Chimura, Osaka (JP); Naoki Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/738,010

(22) Filed: Jan. 9, 2020

(65) Prior Publication Data

US 2020/0236231 A1 Jul. 23, 2020

(30) Foreign Application Priority Data

Jan. 18, 2019 (JP) .............................. JP2019-007090

(51) Int. Cl.
| *G06F 3/12* | (2006.01) |
| *H04N 1/00* | (2006.01) |
| *G06K 15/02* | (2006.01) |
| *G06F 11/34* | (2006.01) |

(52) U.S. Cl.
CPC ....... *H04N 1/00344* (2013.01); *G06F 3/1203* (2013.01); *G06F 3/1229* (2013.01)

(58) Field of Classification Search
None
See application file for complete search history.

(56) References Cited

U.S. PATENT DOCUMENTS

| 6,732,195 | B1 * | 5/2004 | Baldwin | G06F 3/121 |
| | | | | 710/18 |
| 9,772,807 | B1 * | 9/2017 | Osadchyy | H04L 41/12 |
| 10,498,630 | B1 * | 12/2019 | Rajashekara | H04L 43/50 |
| 10,818,392 | B1 * | 10/2020 | Dalen | G01R 31/382 |
| 2002/0082896 | A1 * | 6/2002 | Inagi | G06Q 10/1093 |
| | | | | 705/7.18 |
| 2002/0082924 | A1 * | 6/2002 | Koether | G05B 15/02 |
| | | | | 705/15 |
| 2018/0032416 | A1 * | 2/2018 | McCarty | G06F 11/273 |

FOREIGN PATENT DOCUMENTS

| JP | 2006007516 A | 1/2006 |
| JP | 2018032285 A | 3/2018 |

* cited by examiner

*Primary Examiner* — Beniyam Menberu
(74) *Attorney, Agent, or Firm* — Li & Cai Intellectual Property (USA) Office

(57) ABSTRACT

A server apparatus includes a controller circuit configured to obtain a use time period and a use amount of each of multiple client apparatuses, calculate a use percentage of each of the multiple client apparatuses of each use time period on a basis of the use amount, determine a recommended time period on a basis of the use percentage of each of the multiple client apparatuses, the recommended time period being a time period in which a largest number of client apparatuses are to be maintained, and specify the largest number of client apparatuses to be maintained during the recommended time period.

5 Claims, 8 Drawing Sheets

| Image forming apparatus | Maintenance expected date | Use percentage | | | |
|---|---|---|---|---|---|
| | | Use time period 1 | Use time period 2 | Use time period 3 | Use time period 4 |
| MFP1 | 2019/1/1 | 10% | 10% | 10% | 5% |
| MFP2 | 2019/2/1 | 20% | 10% | 30% | 40% |
| MFP3 | 2019/3/1 | 20% | 30% | 10% | 5% |
| MFP4 | 2019/4/1 | 50% | 50% | 50% | 50% |
| Sum | | 100% | 100% | 100% | 100% |

FIG.7

| Image forming apparatus | Weight | Weighted use percentage | | | |
|---|---|---|---|---|---|
| | | Use time period 1 | Use time period 2 | Use time period 3 | Use time period 4 |
| MFP1 | No weight | 10 | 10 | 10 | 5 |
| MFP2 | ×1.0 | 20 | 10 | 30 | 40 |
| MFP3 | ×1.5 | 30 | 45 | 15 | 7.5 |
| MFP4 | ×2.0 | 100 | 100 | 100 | 100 |

FIG.8

| | Use time period 1 | Use time period 2 | Use time period 3 | Use time period 4 |
|---|---|---|---|---|
| Average value of 2 MFPs | 15 | 10 | 12.5 | 6.25 |
| Average value of 3 MFPs | 20 | 21.7 | 18.3 | 17.5 |
| Average value of 4 MFPs | 40 | 41.25 | 38.75 | 38.125 |

FIG.9

|  | Use time period 1 | Use time period 2 | Use time period 3 | Use time period 4 |
|---|---|---|---|---|
| Standard deviation of 2 MFPs | 5.0 | 0.0 | 2.5 | 1.3 |
| Standard deviation of 3 MFPs | 8.2 | 16.5 | 8.5 | 15.9 |
| Standard deviation of 4 MFPs | 35.4 | 36.8 | 36.1 | 38.3 |

FIG.10

|  | Use time period 1 | Use time period 2 | Use time period 3 | Use time period 4 |
|---|---|---|---|---|
| Number of image forming apparatuses | 2 | 2 | 3 | 2 |

FIG.11

SERVER APPARATUS, MAINTENANCE MANAGEMENT SYSTEM, AND NON-TRANSITORY COMPUTER READABLE RECORDING MEDIUM THAT RECORDS THE MAINTENANCE MANAGEMENT PROGRAM

CROSS-REFERENCE TO RELATED PATENT APPLICATION

This application claims the benefit of Japanese Priority Patent Application JP 2019-007090 filed Jan. 18, 2019, the entire contents of which are incorporated herein by reference.

FIELD OF THE DISCLOSURE

The present disclosure relates to a server apparatus that manages a maintenance expected date of each of multiple client apparatuses. The present disclosure further relates to a maintenance management system including multiple client apparatuses and the server apparatus. The present disclosure further relates to a non-transitory computer readable recording medium that records a maintenance management program executable by the server apparatus.

BACKGROUND OF THE DISCLOSURE

There is known a technology of managing a maintenance expected date of multiple client apparatuses (for example, image forming apparatuses).

SUMMARY OF THE DISCLOSURE

It is desirable that the technology of managing a maintenance expected date of multiple client apparatuses be user-friendly for a user who maintains the multiple client apparatuses.

According to an embodiment of the present disclosure, there is provided a server apparatus, including:
a controller circuit configured to
obtain a use time period and a use amount of each of multiple client apparatuses,
calculate a use percentage of each of the multiple client apparatuses of each use time period on a basis of the use amount,
determine a recommended time period on a basis of the use percentage of each of the multiple client apparatuses, the recommended time period being a time period in which a largest number of client apparatuses are to be maintained, and
specify the largest number of client apparatuses to be maintained during the recommended time period.

According to an embodiment of the present disclosure, there is provided a maintenance management system, including:
multiple client apparatuses; and
a server apparatus including a controller circuit configured to
obtain a use time period and a use amount of each of the multiple client apparatuses,
calculate a use percentage of each of the multiple client apparatuses of each use time period on a basis of the use amount,
determine a recommended time period on a basis of the use percentage of each of the multiple client apparatuses, the recommended time period being a time period in which a largest number of client apparatuses are to be maintained, and
specify the largest number of client apparatuses to be maintained during the recommended time period.

According to an embodiment of the present disclosure, there is provided a non-transitory computer readable recording medium that records a maintenance management program executable by a controller circuit of a server apparatus, the maintenance management program causing the controller circuit of the server apparatus to
obtain a use time period and a use amount of each of multiple client apparatuses,
calculate a use percentage of each of the multiple client apparatuses of each use time period on a basis of the use amount,
determine a recommended time period on a basis of the use percentage of each of the multiple client apparatuses, the recommended time period being a time period in which a largest number of client apparatuses are to be maintained, and
specify the largest number of client apparatuses to be maintained during the recommended time period.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 7 shows a specific example of a maintenance expected date and a use percentage of each of multiple image forming apparatuses;

FIG. 8 shows a specific example of a weighted use percentage of each of the multiple image forming apparatuses;

FIG. 9 shows a specific example of an average value of weighted use percentages of the multiple image forming apparatuses for each use time period;

FIG. 10 shows a specific example of a standard deviation of weighted use percentages of the multiple image forming apparatuses for each use time period; and FIG. 11 shows a specific example of, for each use time period, the number of the multiple image forming apparatuses, which satisfy a condition in which the average value is less than a first threshold and the standard deviation is less than a second threshold.

DETAILED DESCRIPTION OF THE EXEMPLARY EMBODIMENTS

Hereinafter, an embodiment of the present disclosure will be described with reference to the drawings.

1. Maintenance Management System

Figure 1:
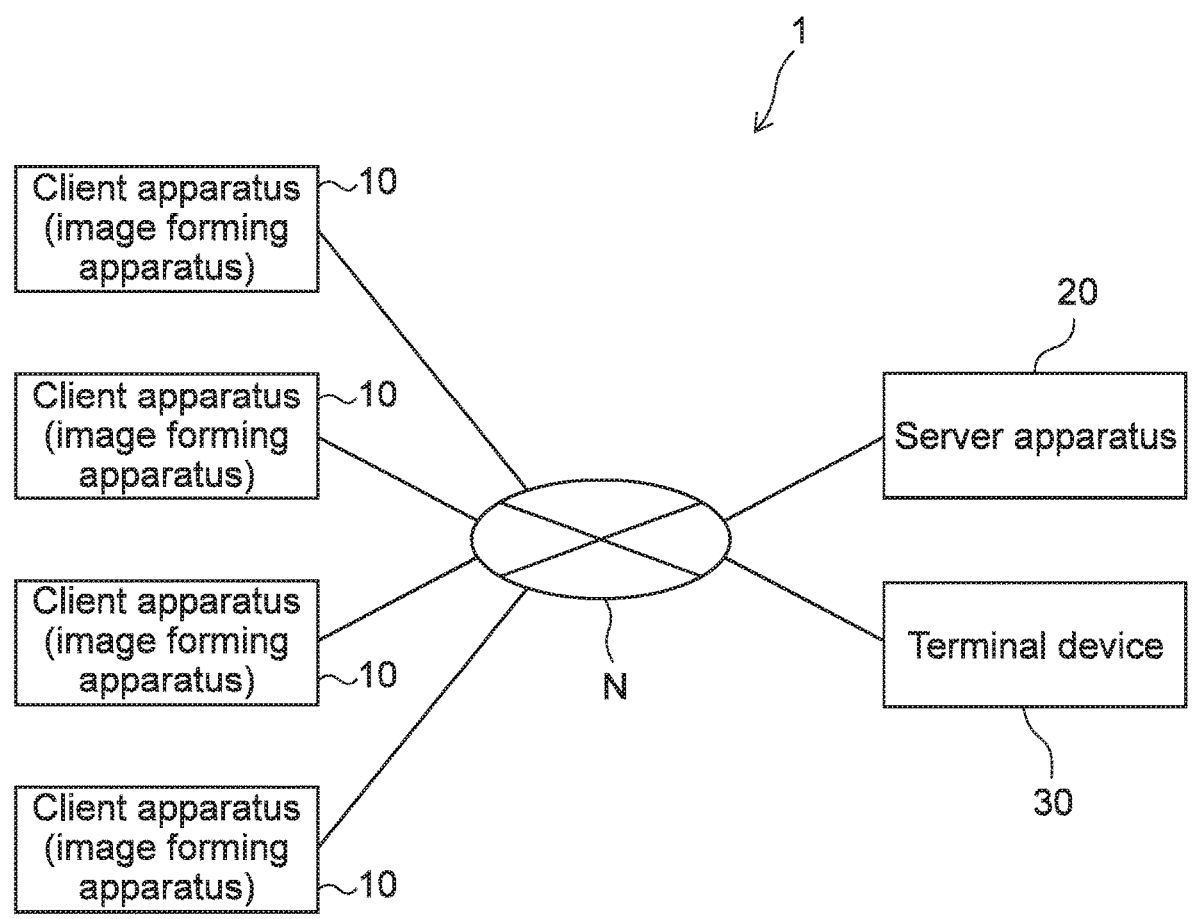
FIG. 1 shows a maintenance management system according to an embodiment of the present disclosure.

FIG. 1 shows a maintenance management system according to an embodiment of the present disclosure.

The maintenance management system 1 includes the multiple client apparatuses 10, the server apparatus 20, and the terminal device 30. The multiple client apparatuses 10, the server apparatus 20, and the terminal device 30 are communicatively connected to each other via the network N.

The multiple client apparatuses 10 are, for example, image forming apparatuses (for example, Multifunction Peripherals, MFPs), and will be referred to as the image forming apparatuses 10 hereinafter. In the following description, a single image forming apparatus 10 will be described where it is not necessary to distinguish between the multiple image forming apparatuses 10.

A service person (hereinafter referred to as user) who maintains the multiple image forming apparatuses 10 uses the terminal device 30. The user maintains the image forming apparatus 10 not remotely, but actually visits a site (office, store, etc.), in which the image forming apparatus 10 is provided, and maintains the image forming apparatus 10. The terminal device 30 is, typically, a mobile device such as a smartphone, a tablet computer, or a laptop computer. Alternatively, the terminal device 30 may be a non-mobile device such as a desktop computer.

The server apparatus 20 manages the maintenance expected date of each of the multiple image forming apparatuses 10. The server apparatus 20 determines the recommended time period, the recommended time period being a time period in which the largest number of image forming apparatuses 10 are to be maintained. The "recommended time period" is the time period in which it is expected that there are the largest number of image forming apparatuses 10 each having a small use amount. The server apparatus 20 informs the terminal device 30 of the recommended time period, and the largest number of image forming apparatuses 10 to be maintained in the recommended time period. As a result, a user of the terminal device 30 may maintain the largest number of image forming apparatuses 10 in the recommended time period (time period in which the use amount of the image forming apparatuses 10 is small).

2. Hardware Configuration of Image Forming Apparatus

Figure 2:
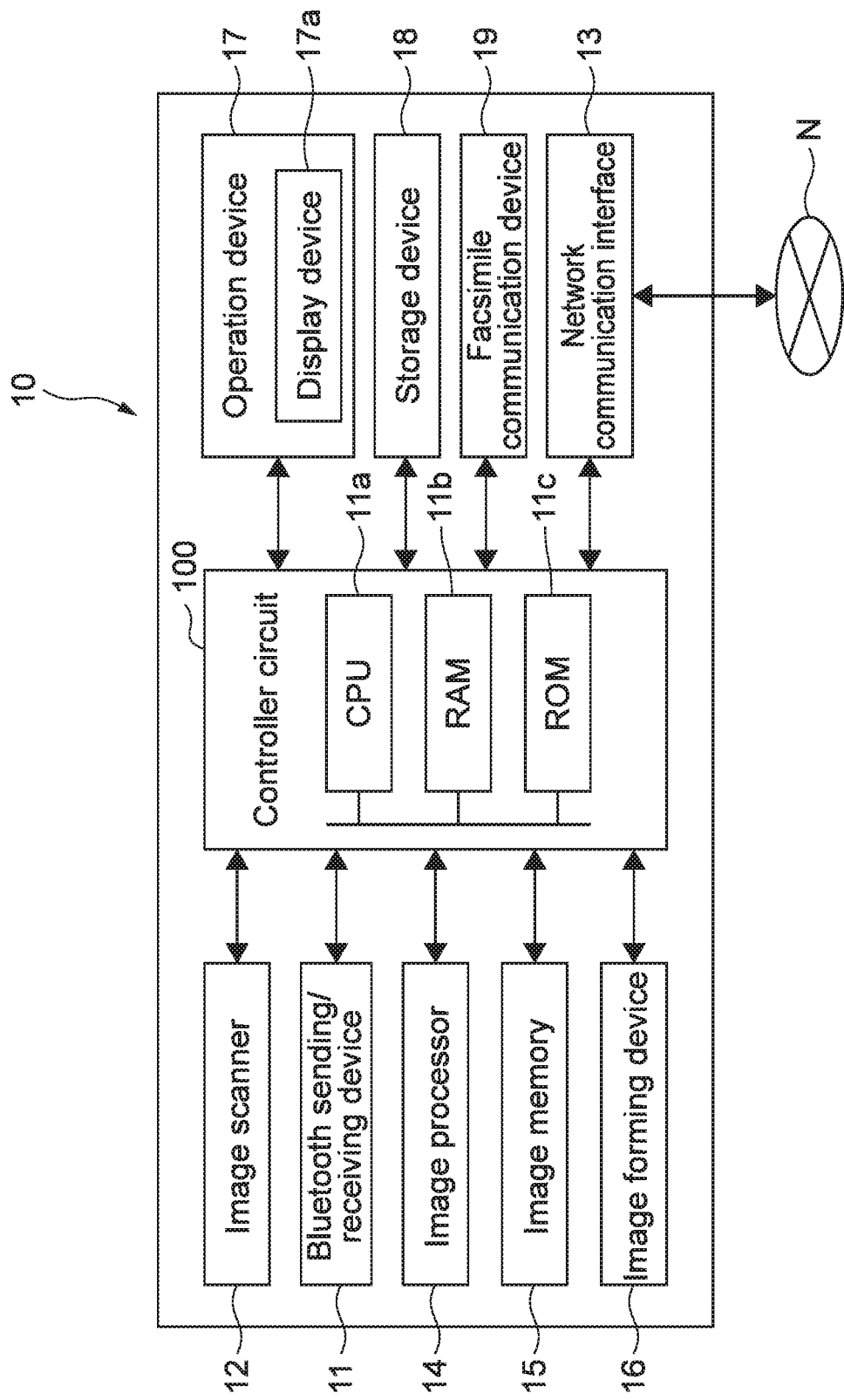
FIG. 2 shows a hardware configuration of an image forming apparatus.

FIG. 2 shows a hardware configuration of an image forming apparatus.

The image forming apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 100 is connected to the Bluetooth (registered trademark) sending/receiving device 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

3. Hardware Configuration of Server Apparatus

Figure 3:
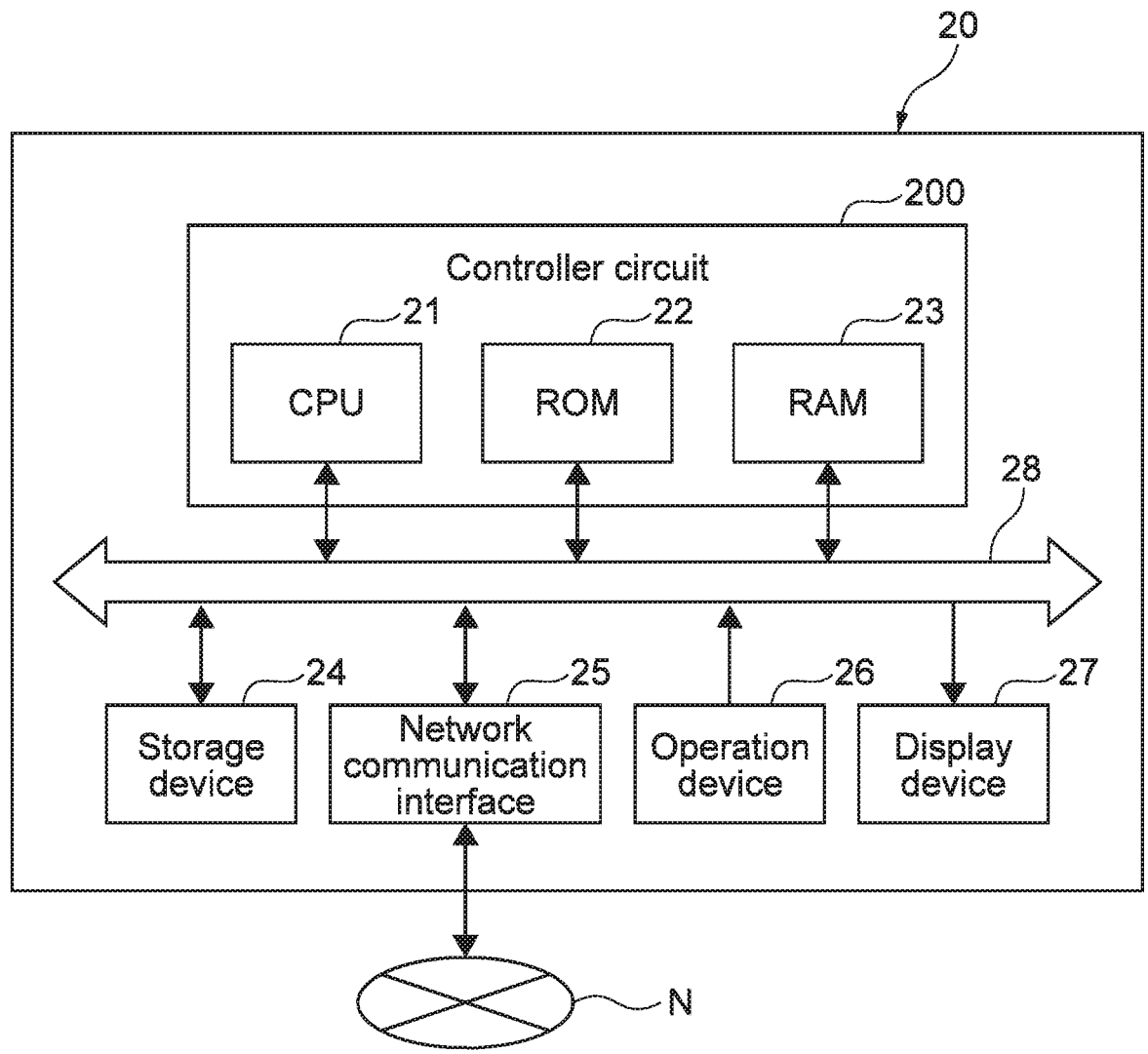
FIG. 3 shows a hardware configuration of a server apparatus.

FIG. 3 shows a hardware configuration of a server apparatus.

The server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

4. Hardware Configuration of Terminal Device

Figure 4:
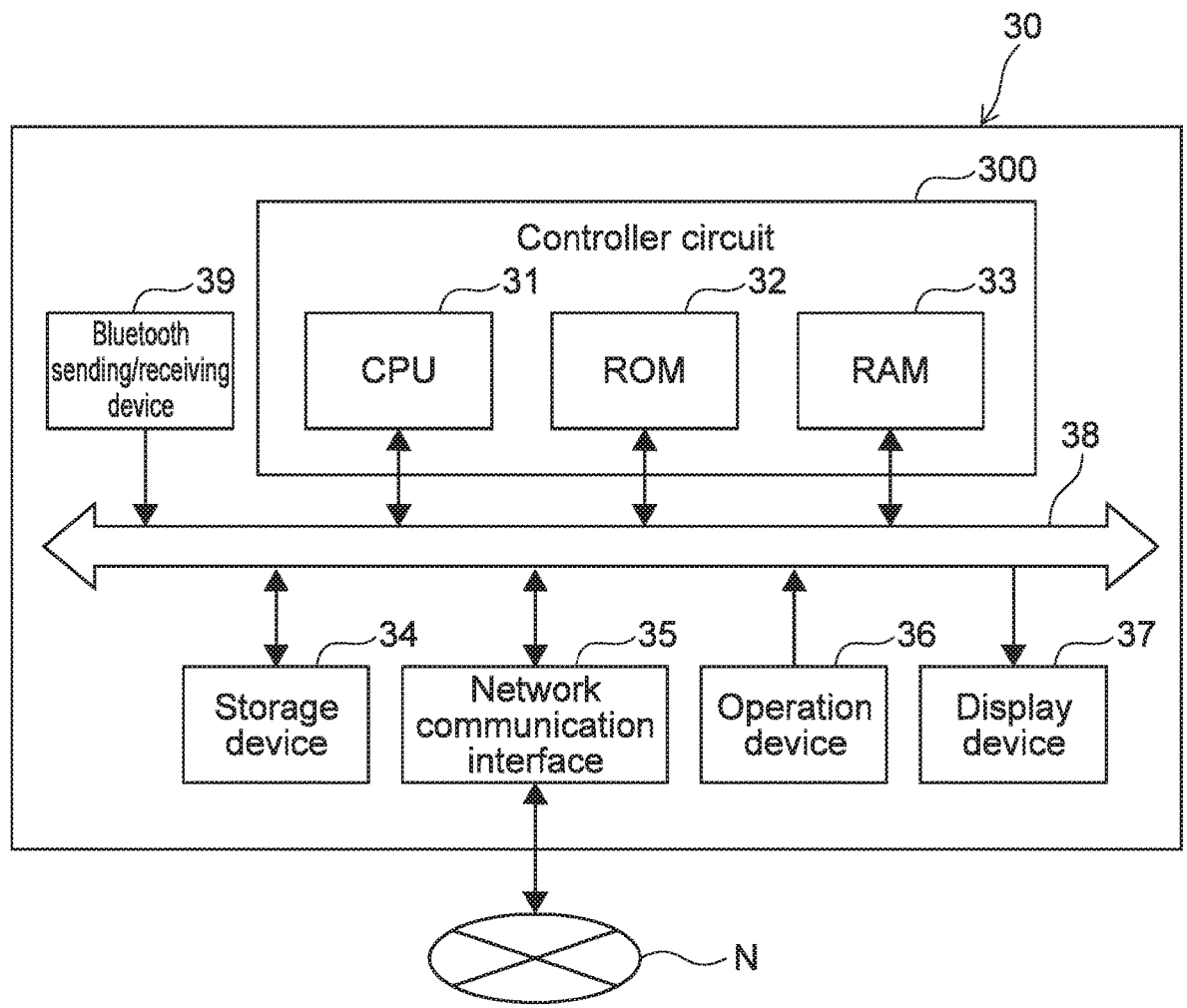
FIG. 4 shows a hardware configuration of a terminal device.

FIG. 4 shows a hardware configuration of a terminal device.

The terminal device 30 includes the CPU 31, the ROM 32, the RAM 33, the storage device 34, which is a large-volume nonvolatile memory such as an HDD or an SSD, the network communication interface 35, the operation device 36, the display device 37, and the Bluetooth (registered trademark) sending/receiving device 39, and the bus 38 connecting them to each other. The operation device 36 is one mode of an input device. A sound input device including a microphone may be provided as an input device.

The controller circuit 300 includes the CPU 31, the ROM 32, and the RAM 33. The CPU 31 loads information processing programs stored in the ROM 32 in the RAM 33 and executes the information processing programs. The ROM 32 stores programs executed by the CPU 31, data, and the like nonvolatile. The ROM 32 is an example of a non-transitory computer readable recording medium.

5. Functional Configuration of Server Apparatus

Figure 5:
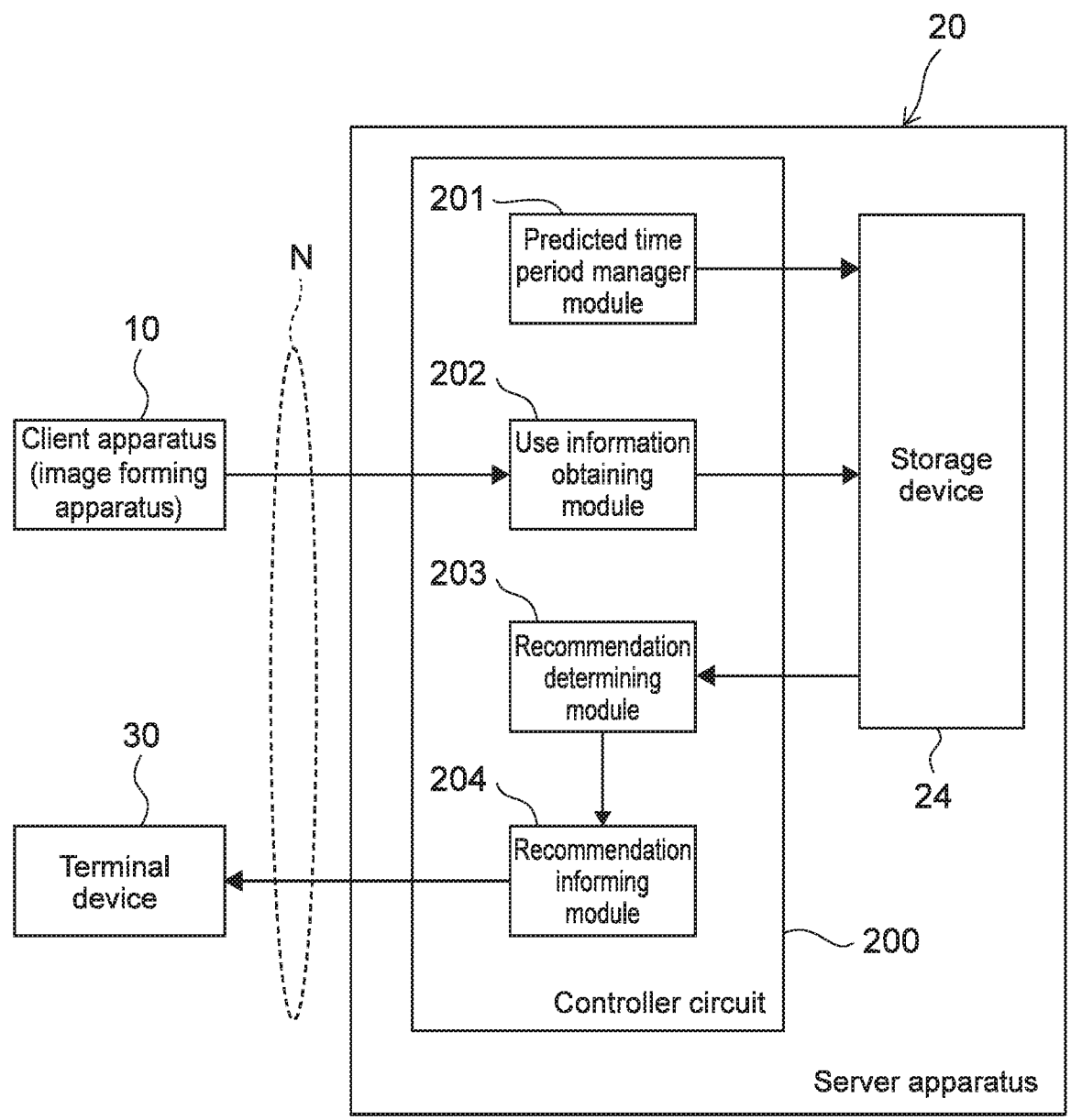
FIG. 5 shows a functional configuration of the server apparatus.

FIG. 5 shows a functional configuration of the server apparatus.

In the controller circuit 200 of the server apparatus 20, the CPU 21 loads an information processing program stored in the ROM 22 in the RAM 23 and executes the information processing program to operate as the predicted time period manager module 201, the use information obtaining module 202, the recommendation determining module 203, and the recommendation informing module 204.

6. Operational Flow of Server Apparatus

Figure 6:
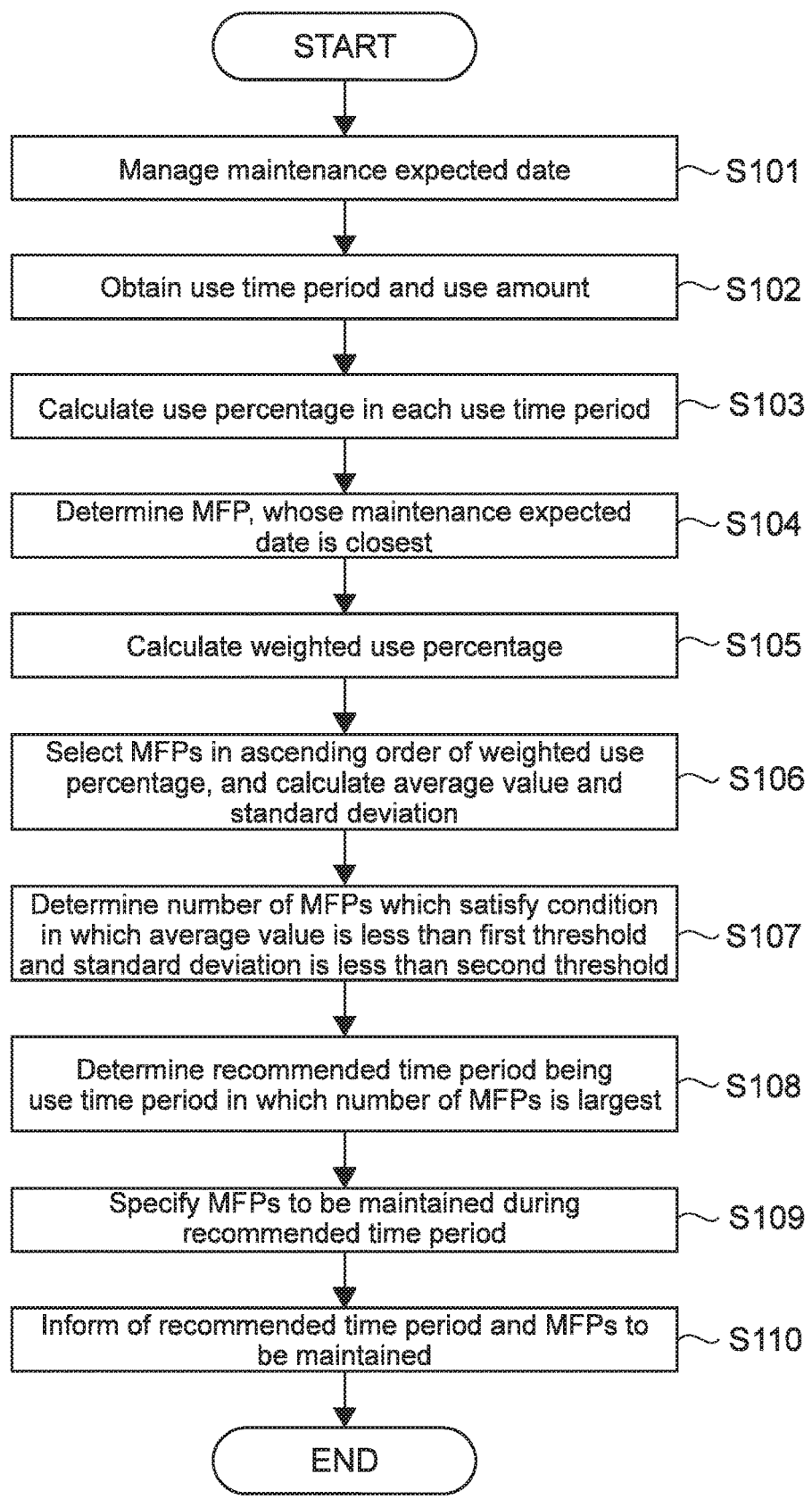
FIG. 6 shows an operational flow of the server apparatus.

FIG. 6 shows an operational flow of the server apparatus.

The predicted time period manager module 201 manages the maintenance expected date of each of the multiple image forming apparatuses 10. The predicted time period manager module 201 stores the maintenance expected date of each of the multiple image forming apparatuses 10 in the storage device 24 (Step S101). The "maintenance expected date" includes, for example, the next regular maintenance predicted time period, the next replacement time period for a consumable product, the time period in which an image forming apparatus 10 is to be maintained in a case where the image forming apparatus 10 has a trouble, and the like.

The use information obtaining module 202 obtains the use time period and the use amount of each of the multiple image forming apparatuses 10, and stores the use time period and the use amount in the storage device 24 (Step S102). Specific examples of the "use amount" include the number of printed sheets where the image forming apparatus 10 executes a print function, or the time length of executing any function (print, scan, facsimile, etc.) by the image forming apparatus 10. A specific example of the "use time period" is the time period (for example, day of week, time period such as am/pm, etc.) which includes the date-and-time at which the image forming apparatus 10 executed the function. The use information obtaining module 202 may receive (for example, at regular intervals) the use time period and the use amount from the image forming apparatus 10. Alternatively, the use information obtaining module 202 may receive (for example, at regular intervals) the use time period and the use amount from a server apparatus (not shown) that stores the use time period and the use amount received from the image forming apparatus 10. Alternatively, the use information obtaining module 202 may receive the use date-and-time (start date-and-time and end date-and-time) instead of the use time period, and may determine the use time period on a basis of the use date-and-time (start date-and-time and end date-and-time). Specifically, the use information obtaining module 202 may receive the start date-and-time and the end date-and-time of using a function by the image forming apparatus 10, and may determine the use time period (am/pm, etc.) which includes at least one of the start date-and-time and the end date-and-time.

The recommendation determining module 203 calculates the use percentage of each of the multiple image forming apparatuses 10 in each use time period on a basis of the use amount (Step S103). The "use percentage" is a percentage of the use amount of each image forming apparatus 10 in each use time period, where the sum of the use amounts of all the image forming apparatuses 10 is 100%.

FIG. 7 shows a specific example of a maintenance expected date and a use percentage of each of multiple image forming apparatuses.

In the example of FIG. 7, the maintenance expected date of the image forming apparatus "MFP 1" is "2019/1/1". The maintenance expected date of the image forming apparatus "MFP 2" is "2019/2/1". The maintenance expected date of the image forming apparatus "MFP 3" is "2019/3/1". The maintenance expected date of the image forming apparatus "MFP 4" is "2019/4/1".

In the "use time period 1" (for example, Monday), the use percentage of the image forming apparatus "MFP 1" is "10%". The use percentage of the image forming apparatus "MFP 2" is "20%". The use percentage of the image forming apparatus "MFP 3" is "20%". The use percentage of the image forming apparatus "MFP 4" is "50%". The sum is 100%.

In the "use time period 2" (for example, Tuesday), the use percentage of the image forming apparatus "MFP 1" is "10%". The use percentage of the image forming apparatus "MFP 2" is "10%". The use percentage of the image forming apparatus "MFP 3" is "30%". The use percentage of the image forming apparatus "MFP 4" is "50%". The sum is 100%.

In the "use time period 3" (for example, Wednesday), the use percentage of the image forming apparatus "MFP 1" is "10%". The use percentage of the image forming apparatus "MFP 2" is "30%". The use percentage of the image forming apparatus "MFP 3" is "10%". The use percentage of the image forming apparatus "MFP 4" is "50%". The sum is 100%.

In the "use time period 4" (for example, Thursday), the use percentage of the image forming apparatus "MFP 1" is "10%". The use percentage of the image forming apparatus "MFP 2" is "40%". The use percentage of the image forming apparatus "MFP 3" is "5%". The use percentage of the image forming apparatus "MFP 4" is "50%". The sum is 100%.

The recommendation determining module 203 determines the image forming apparatus 10, whose maintenance expected date is the closest, out of the multiple image forming apparatuses 10 on a basis of the maintenance expected dates of the multiple image forming apparatuses 10 (Step S104). In the example of FIG. 7, the recommendation determining module 203 determines the image forming apparatus "MFP 1", whose maintenance expected date "2019/1/1" is the closest.

The recommendation determining module 203 calculates a weighted use percentage, the weighted use percentage being a weighted value of the use percentage of each of the multiple image forming apparatuses 10, by multiplying the use percentage of the image forming apparatus 10, whose maintenance expected date is farther, by a larger value (Step S105). For example, the recommendation determining module 203 weights each maintenance expected date, by multiplying 1.0 where the maintenance expected date is within 1 month from the reference date, multiplying 1.5 where the maintenance expected date is farther than 1 month and within 2 months from the reference date, multiplying 2.0 where the maintenance expected date is farther than 2 months and within 3 months from the reference date, and so on, the closest maintenance expected date being the reference date.

FIG. 8 shows a specific example of a weighted use percentage of each of the multiple image forming apparatuses.

In the example of FIG. 8, the maintenance expected date "2019/1/1" of the image forming apparatus "MFP 1" is the reference date as it is. So the use percentage of each use time period is not weighted. The weighted use percentage of the "use time period 1" is "10". The weighted use percentage of the "use time period 2" is "10". The weighted use percentage of the "use time period 3" is "10". The weighted use percentage of the "use time period 4" is "5".

The maintenance expected date "2019/2/1" of the image forming apparatus "MFP 2" is within 1 month from the reference date "2019/1/1". So the use percentage of each use time period is weighted by multiplying the use percentage by 1.0. The weighted use percentage of the "use time period 1" is the use percentage "20"×1.0="20". The weighted use percentage of the "use time period 2" is the use percentage "10"×1.0="10". The weighted use percentage of the "use time period 3" is the use percentage "30"×1.0="30". The weighted use percentage of the "use time period 4" is the use percentage "40"×1.0="40".

The maintenance expected date "2019/3/1" of the image forming apparatus "MFP 3" is farther than 1 month and within 2 months from the reference date "2019/1/1". So the use percentage of each use time period is weighted by multiplying the use percentage by 1.5. The weighted use percentage of the "use time period 1" is the use percentage "20"×1.5="30". The weighted use percentage of the "use time period 2" is the use percentage "30"×1.5="45". The weighted use percentage of the "use time period 3" is the use percentage "10"×1.5="15". The weighted use percentage of the "use time period 4" is the use percentage "5"×1.5="7.5".

The maintenance expected date "2019/4/1" of the image forming apparatus "MFP 4" is farther than 2 months and within 3 months from the reference date "2019/1/1". So the use percentage of each use time period is weighted by multiplying the use percentage by 2.0. The weighted use percentage of the "use time period 1" is the use percentage "50"×2.0="100". The weighted use percentage of the "use time period 2" is the use percentage "50"×2.0="100". The weighted use percentage of the "use time period 3" is the use percentage "50"×2.0="100". The weighted use percentage of the "use time period 4" is the use percentage "50"×2.0="100".

The recommendation determining module 203 selects the multiple image forming apparatuses 10 for each use time period, in an ascending order of the weighted use percentage, and calculates an average value and a standard deviation of the weighted use percentages of the selected multiple image forming apparatuses 10 (Step S106). The number of the selected image forming apparatuses 10 is all the numbers from 2 to the total number of the image forming apparatuses 10. In the example of FIG. 8, the number of the selected image forming apparatuses 10 is all the numbers (i.e., 2, 3, and 4) from 2 to the total number (i.e., 4) of the image forming apparatuses 10.

FIG. 9 shows a specific example of an average value of weighted use percentages of the multiple image forming apparatuses for each use time period.

FIG. 10 shows a specific example of a standard deviation of weighted use percentages of the multiple image forming apparatuses for each use time period.

In the "use time period 1", the two image forming apparatuses "MFP 1" and "MFP 2" having the lowest weighted use percentage "10" and the second lowest weighted use percentage "20" (FIG. 8, underlined) are selected. The average value of the weighted use percentages "10" and "20" of the two image forming apparatuses "MFP 1" and "MFP 2" is "15" (FIG. 9), and the standard deviation is "5.0" (FIG. 10). In the "use time period 1", the image forming apparatus "MFP 3" having the third lowest weighted use percentage "30" (FIG. 8, double-underlined) is further selected. The average value of the weighted use percentages "10", "20", and "30" of the three image forming apparatuses "MFP 1", "MFP 2", and "MFP 3" is "20" (FIG. 9), and the standard deviation is "8.2" (FIG. 10). In the "use time period 1", all the image forming apparatuses "MFP 1" to "MFP 4" are selected. The average value of the weighted use percentages "10", "20", "30", and "100" of the four image forming apparatuses "MFP 1", "MFP 2", "MFP 3", and "MFP 4" is "40" (FIG. 9), and the standard deviation is "35.4" (FIG. 10).

In the "use time period 2", the two image forming apparatuses "MFP 1" and "MFP 2" having the lowest weighted use percentage "10" and the second lowest (in this example, which is equal to the lowest value) weighted use percentage "10" (FIG. 8, underlined) are selected. The average value of the weighted use percentages "10" and "10" of the two image forming apparatuses "MFP 1" and "MFP 2" is "10" (FIG. 9), and the standard deviation is "0.0" (FIG. 10). In the "use time period 2", the image forming apparatus "MFP 3" having the third lowest weighted use percentage "45" (FIG. 8, double-underlined) is further selected. The average value of the weighted use percentages "10", "10", and "45" of the three image forming apparatuses "MFP 1", "MFP 2", and "MFP 3" is "21.7" (FIG. 9), and the standard deviation is "16.5" (FIG. 10). In the "use time period 2", all the image forming apparatuses "MFP 1" to "MFP 4" are selected. The average value of the weighted use percentages "10", "10", "45", and "100" of the four image forming apparatuses "MFP 1", "MFP 2", "MFP 3", and "MFP 4" is "41.25" (FIG. 9), and the standard deviation is "36.8" (FIG. 10).

In the "use time period 3", the two image forming apparatuses "MFP 1" and "MFP 3" having the lowest weighted use percentage "10" and the second lowest weighted use percentage "15" (FIG. 8, underlined) are selected. The average value of the weighted use percentages "10" and "15" of the two image forming apparatuses "MFP 1" and "MFP 3" is "12.5" (FIG. 9), and the standard deviation is "2.5" (FIG. 10). In the "use time period 3", the image forming apparatus "MFP 2" having the third lowest weighted use percentage "30" (FIG. 8, double-underlined) is further selected. The average value of the weighted use percentages "10", "15", and "30" of the three image forming apparatuses "MFP 1", "MFP 3", and "MFP 2" is "18.3" (FIG. 9), and the standard deviation is "8.5" (FIG. 10). In the "use time period 3", all the image forming apparatuses "MFP 1" to "MFP 4" are selected. The average value of the weighted use percentages "10", "20", "30", and "100" of the four image forming apparatuses "MFP 1", "MFP 3", "MFP 2", and "MFP 4" is "38.75" (FIG. 9), and the standard deviation is "36.1" (FIG. 10).

In the "use time period 4", the two image forming apparatuses "MFP 1" and "MFP 3" having the lowest weighted use percentage "5" and the second lowest weighted use percentage "7.5" (FIG. 8, underlined) are selected. The average value of the weighted use percentages "5" and "7.5" of the two image forming apparatuses "MFP 1" and "MFP 3" is "6.25" (FIG. 9), and the standard deviation is "1.3" (FIG. 10). In the "use time period 4", the image forming apparatus "MFP 2" having the third lowest weighted use percentage "40" (FIG. 8, double-underlined) is further selected.

The average value of the weighted use percentages "5", "7.5", and "40" of the three image forming apparatuses "MFP 1", "MFP 3", and "MFP 2" is "17.5" (FIG. 9), and the standard deviation is "15.9" (FIG. 10). In the "use time period 4", all the image forming apparatuses "MFP 1" to "MFP 4" are selected. The average value of the weighted use percentages "5", "7.5", "40", and "100" of the four image forming apparatuses "MFP 1", "MFP 3", "MFP 2", and "MFP 4" is "38.125" (FIG. 9), and the standard deviation is "38.3" (FIG. 10).

The recommendation determining module 203 determines, for each use time period, the number of the multiple image forming apparatuses 10, which satisfy a condition in which the average value is less than a first threshold and the standard deviation is less than a second threshold (Step S107). In this example, the first threshold=20.0, and the second threshold=10.0.

FIG. 11 shows a specific example of, for each use time period, the number of the multiple image forming apparatuses, which satisfy a condition in which the average value is less than a first threshold and the standard deviation is less than a second threshold.

In the "use time period 1", the average value less than the first threshold "20.0" is the average value "15" of the two image forming apparatuses 10 (FIG. 9, underlined). In the "use time period 1", the standard deviations less than the second threshold "10.0" are the standard deviation "5.0" of the two image forming apparatuses 10 and the standard deviation "8.2" of the three image forming apparatuses 10

(FIG. 10, underlined). So, in the "use time period 1", the number of the multiple image forming apparatuses 10, which satisfy the condition in which the average value is less than the first threshold and the standard deviation is less than the second threshold, is "2" (FIG. 11).

In the "use time period 2", the average value less than the first threshold "20.0" is the average value "10" of the two image forming apparatuses 10 (FIG. 9, underlined). In the "use time period 2", the standard deviations less than the second threshold "10.0" is the standard deviation "0.0" of the two image forming apparatuses 10 (FIG. 10, underlined). So, in the "use time period 2", the number of the multiple image forming apparatuses 10, which satisfy the condition in which the average value is less than the first threshold and the standard deviation is less than the second threshold, is "2" (FIG. 11).

In the "use time period 3", the average values less than the first threshold "20.0" are the average value "12.5" of the two image forming apparatuses 10 and the average value "18.3" of the three image forming apparatuses 10 (FIG. 9, underlined). In the "use time period 3", the standard deviations less than the second threshold "10.0" are the standard deviation "2.5" of the two image forming apparatuses 10 and the standard deviation "8.5" of the three image forming apparatuses 10 (FIG. 10, underlined). So, in the "use time period 3", the number of the multiple image forming apparatuses 10, which satisfy the condition in which the average value is less than the first threshold and the standard deviation is less than the second threshold, is "3" (FIG. 11).

In the "use time period 4", the average values less than the first threshold "20.0" are the average value "3.75" of the two image forming apparatuses 10 and the average value "17.5" of the three image forming apparatuses 10 (FIG. 9, underlined). In the "use time period 4", the standard deviation less than the second threshold "10.0" is the standard deviation "1.3" of the two image forming apparatuses 10 (FIG. 10, underlined). So, in the "use time period 4", the number of the multiple image forming apparatuses 10, which satisfy the condition in which the average value is less than the first threshold and the standard deviation is less than the second threshold, is "2" (FIG. 11).

The recommendation determining module 203 determines a recommended time period, the recommended time period being a use time period in which the number of the multiple image forming apparatuses 10 is the largest (Step S108). As described above, the "recommended time period" is a time period in which the largest number of image forming apparatuses 10 are to be maintained. Specifically, the "recommended time period" is a time period in which it is expected that the use amount of the largest number of image forming apparatuses 10 is small.

In the example of FIG. 11, in the "use time period 1", the "use time period 2", and the "use time period 4", the number of the multiple image forming apparatuses 10, which satisfy the condition in which the average value is less than the first threshold and the standard deviation is less than the second threshold, is "2". In the "use time period 3", the number of the multiple image forming apparatuses 10, which satisfy the condition in which the average value is less than the first threshold and the standard deviation is less than the second threshold, is "3". So the recommendation determining module 203 determines, as the recommended time period, the "use time period 3" having the largest number "3" of the image forming apparatuses 10 (FIG. 11, underlined).

The recommendation determining module 203 specifies the largest number of image forming apparatuses 10 to be maintained during the recommended time period (Step S109). Specifically, the recommendation determining module 203 specifies the determined number of the multiple image forming apparatuses 10 in the ascending order of the weighted use percentage in the recommended time period. In this example, the recommendation determining module 203 specifies the determined number (FIG. 11, "3") of the multiple image forming apparatuses 10 (FIG. 8, "MFP 1", "MFP 3", and "MFP 2") in the ascending order (FIG. 8, "10", "15", and "30") of the weighted use percentage in the recommended time period, i.e., the "use time period 3". It means that the image forming apparatuses "MFP 1", "MFP 3", and "MFP 2" are to be maintained during the "use time period 3".

The recommendation informing module 204 informs the terminal device 30 of the recommended time period and the multiple image forming apparatuses 10 to be maintained during the recommended time period (Step S110). In this example, the recommendation informing module 204 informs the terminal device 30 of the recommended time period, i.e., the "use time period 3" (for example, Wednesday), and the multiple image forming apparatuses "MFP 1", "MFP 3", and "MFP 2" to be maintained during the recommended time period, i.e., the "use time period 3". According to the information, a user of the terminal device 30 may maintain the image forming apparatuses "MFP 1", "MFP 3", and "MFP 2" during the time period (in this example, next Wednesday) corresponding to the closest "use time period 3".

7. Modification Example

In the present embodiment, the recommendation determining module 203 calculates a use percentage of each of the multiple image forming apparatuses 10 of each use time period on a basis of the use amount (Step S103). Instead, the recommendation determining module 203 may, without calculating use percentages, calculate weighted use amount values, and determine the recommended time period on a basis of the weighted use amount values.

In the present embodiment, the recommendation determining module 203 weights each maintenance expected date, by multiplying 1.0 where the maintenance expected date is within 1 month from the reference date, the closest maintenance expected date being the reference date (Step S105). According to this method, both the closest maintenance expected date and the maintenance expected date within 1 month from the reference date are multiplied by 1.0. Instead, the recommendation determining module 203 may weight each maintenance expected date, by multiplying a value larger than 1.0 where the maintenance expected date is within 1 month from the reference date, the closest maintenance expected date being the reference (i.e., multiplied by 1.0). As a result, the image forming apparatus 10, which has the closest maintenance expected date, is selected, with a higher probability, as an image forming apparatus to be maintained during the recommended time period.

In the present embodiment, the recommendation determining module 203 selects the multiple image forming apparatuses 10 in an ascending order of the weighted use percentage, and calculates an average value and a standard deviation of the weighted use percentages (Step S106). Instead, the recommendation determining module 203 may inevitably select the image forming apparatus 10 whose maintenance expected date is the closest, and calculate an average value and a standard deviation of the weighted use percentages. As a result, the image forming apparatus 10, which has the closest maintenance expected date, may be selected reliably as an image forming apparatus to be maintained during the recommended time period.

8. Conclusion (1) According to the present embodiment, the server apparatus 20 calculates a use percentage of each of the multiple image forming apparatuses 10 of each use time period on a basis of the use amount, and determines a recommended time period on a basis of the use percentage of each of the number of image forming apparatuses 10, the recommended time period being a time period in which the largest number of image forming apparatuses 10 are to be maintained. As a result, the server apparatus 20 is capable of determining the recommended time period appropriate to maintain the largest number of image forming apparatuses 10, i.e., the time period in which it is expected that the use amount of the largest number of image forming apparatuses 10 is small.

(2) According to the present embodiment, the server apparatus 20 weights the use percentage of the image forming apparatus 10 depending on the maintenance expected date. As a result, the image forming apparatus 10, which has the closer maintenance expected date (necessity of maintenance is relatively high), is selected, with a higher probability, as an image forming apparatus to be maintained during the recommended time period. To the contrary, the image forming apparatus 10, which has the farther maintenance expected date (necessity of maintenance is relatively low), is not selected, with a higher probability, as an image forming apparatus to be maintained during the recommended time period. According to the present embodiment, the server apparatus 20 calculates an average value of weighted use percentages of the image forming apparatuses 10. The server apparatus 20 is capable of determining that the time period having a smaller calculated average value (specifically, less than first threshold) as the time period appropriate to maintain the largest number of image forming apparatuses 10. Further, the server apparatus 20 calculates a standard deviation of weighted use percentages of the image forming apparatuses 10. The server apparatus 20 excludes the use time period having a large calculated standard deviation (specifically, second threshold or more). As a result, the server apparatus 20 is capable of excluding the combination of the image forming apparatus 10 whose weighted use percentage is extremely high and the image forming apparatus 10 whose weighted use percentage is extremely low.

(3) According to the present embodiment, the server apparatus 20 determines the image forming apparatus 10, whose maintenance expected date is the closest, as an image forming apparatus 10 to be maintained during the recommended time period. As a result, the server apparatus 20 is capable of reliably selecting the image forming apparatus 10, whose necessity of maintenance is the highest, as an image forming apparatus 10 to be maintained during the recommended time period.

(4) According to the present embodiment, the server apparatus 20 informs the terminal device 30 of the recommended time period and the multiple image forming apparatuses 10 to be maintained during the recommended time period. As a result, during the recommended time period, a user of the terminal device 30 is capable of maintaining the largest number of image forming apparatuses 10, in a batch, each of whose maintenance expected date is yet to arrive actually but each of whose necessity of maintenance is relatively high and use amount is expected to be small.

Typically, a user has to determine, by himself/herself, an image forming apparatus 10 to be maintained when the user maintains image forming apparatus 10, whose maintenance expected date is yet to arrive actually. To the contrary, according to the present embodiment, without determining by himself/herself, a user may appropriately know the largest number of image forming apparatuses 10 to be maintained in a recommended time period.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus, comprising:
a controller circuit configured to
   obtain a use time period and a use amount of each of multiple client apparatuses,
   calculate a use percentage of each of the multiple client apparatuses of each use time period on a basis of the use amount,
   determine a recommended time period on a basis of the use percentage of each of the multiple client apparatuses, the recommended time period being a time period in which a largest number of client apparatuses are to be maintained, and
   specify the largest number of client apparatuses to be maintained during the recommended time period, wherein
the controller circuit is further configured to
   determine a maintenance expected date of each of the multiple client apparatuses,
   in the step of determining the recommended time period,
      calculate a weighted use percentage, the weighted use percentage being a weighted value of the use percentage of each of the multiple client apparatuses, by multiplying the use percentage of a client apparatus, whose maintenance expected date is farther, by a larger value,
      select multiple client apparatuses for each use time period, in an ascending order of the weighted use percentage,
      calculate an average value and a standard deviation of the weighted use percentages of the selected multiple client apparatuses,
      determine, for each use time period, a number of the multiple client apparatuses, which satisfy a condition in which the average value is less than a first threshold and the standard deviation is less than a second threshold, and
      determine, as the recommended time period, the use time period in which the number of the multiple client apparatuses is a largest number, and
   in the step of specifying the largest number of client apparatuses to be maintained during the recommended time period,
      specify, as the largest number of client apparatuses to be maintained during the recommended time period, the determined number of the multiple client apparatuses in an ascending order of the weighted use percentage during the recommended time period.

2. The server apparatus according to claim 1, wherein the controller circuit is further configured to
   determine a client apparatus, whose maintenance expected date is closest, out of the multiple client apparatuses on a basis of the maintenance expected date, and in the step of determining the recommended time period,
  determine a recommended time period on a basis of the use percentage of each of the multiple client apparatuses, the recommended time period being a time period in which the largest number of client apparatuses are to be maintained, the largest number of client apparatuses including the client apparatus whose maintenance expected date is the closest.

3. The server apparatus according to claim 1, wherein the controller circuit is further configured to
inform a terminal device of the recommended time period and the multiple client apparatuses to be maintained during the recommended time period.

4. A maintenance management system, comprising:
multiple client apparatuses; and
a server apparatus including a controller circuit configured to
  obtain a use time period and a use amount of each of the multiple client apparatuses,
  calculate a use percentage of each of the multiple client apparatuses of each use time period on a basis of the use amount,
  determine a recommended time period on a basis of the use percentage of each of the multiple client apparatuses, the recommended time period being a time period in which a largest number of client apparatuses are to be maintained, and
  specify the largest number of client apparatuses to be maintained during the recommended time period, wherein
the controller circuit is further configured to
determine a maintenance expected date of each of the multiple client apparatuses,
in the step of determining the recommended time period,
  calculate a weighted use percentage, the weighted use percentage being a weighted value of the use percentage of each of the multiple client apparatuses, by multiplying the use percentage of a client apparatus, whose maintenance expected date is farther, by a larger value,
  select multiple client apparatuses for each use time period, in an ascending order of the weighted use percentage,
  calculate an average value and a standard deviation of the weighted use percentages of the selected multiple client apparatuses,
  determine, for each use time period, a number of the multiple client apparatuses, which satisfy a condition in which the average value is less than a first threshold and the standard deviation is less than a second threshold, and
  determine, as the recommended time period, the use time period in which the number of the multiple client apparatuses is a largest number, and
in the step of specifying the largest number of client apparatuses to be maintained during the recommended time period,
  specify, as the largest number of client apparatuses to be maintained during the recommended time period, the determined number of the multiple client apparatuses in an ascending order of the weighted use percentage during the recommended time period.

5. A non-transitory computer readable recording medium that records a maintenance management program executable by a controller circuit of a server apparatus, the maintenance management program causing the controller circuit of the server apparatus to
  obtain a use time period and a use amount of each of multiple client apparatuses,
  calculate a use percentage of each of the multiple client apparatuses of each use time period on a basis of the use amount,
  determine a recommended time period on a basis of the use percentage of each of the multiple client apparatuses, the recommended time period being a time period in which a largest number of client apparatuses are to be maintained, and
  specify the largest number of client apparatuses to be maintained during the recommended time period, wherein
the maintenance management program further causes the controller circuit of the server apparatus to
determine a maintenance expected date of each of the multiple client apparatuses,
in the step of determining the recommended time period,
  calculate a weighted use percentage, the weighted use percentage being a weighted value of the use percentage of each of the multiple client apparatuses, by multiplying the use percentage of a client apparatus, whose maintenance expected date is farther, by a larger value,
  select multiple client apparatuses for each use time period, in an ascending order of the weighted use percentage,
  calculate an average value and a standard deviation of the weighted use percentages of the selected multiple client apparatuses,
  determine, for each use time period, a number of the multiple client apparatuses, which satisfy a condition in which the average value is less than a first threshold and the standard deviation is less than a second threshold, and
  determine, as the recommended time period, the use time period in which the number of the multiple client apparatuses is a largest number, and
in the step of specifying the largest number of client apparatuses to be maintained during the recommended time period,
  specify, as the largest number of client apparatuses to be maintained during the recommended time period, the determined number of the multiple client apparatuses in an ascending order of the weighted use percentage during the recommended time period.

\* \* \* \* \*